United States Patent [19]
Coran et al.

[11] Patent Number: 5,382,629
[45] Date of Patent: Jan. 17, 1995

[54] RUBBER COMPOSITIONS COMPRISING A POLYMERIC AMINE CO-ACTIVATOR

[75] Inventors: Aubert Y. Coran, Akron, Ohio; Samuel J. Tremont, Manchester, Mo.; Leonard H. Davis, New City, N.Y.; Frederick Ignatz-Hoover, Elyria, Ohio; Martin P. McGrath, Webster Groves, Mo.

[73] Assignee: Monsanto Company, St. Louis, Mo.

[21] Appl. No.: 181,937

[22] Filed: Jan. 18, 1994

[51] Int. Cl.6 .......................... C08L 9/00; C08L 15/00; C08L 23/16; C08L 23/26
[52] U.S. Cl. ..................................... 525/194; 525/77; 525/211; 525/217; 525/236; 525/237; 525/233; 525/315
[58] Field of Search ............... 525/194, 192, 217, 236, 525/237, 233, 211, 77, 315

[56] References Cited

U.S. PATENT DOCUMENTS

| | | |
|---|---|---|
| 2,952,043 | 9/1960 | Uraneck et al. . |
| 3,177,165 | 4/1965 | Morris et al. . |
| 3,821,134 | 6/1974 | Son et al. . |
| 4,138,389 | 2/1979 | Edwards . |
| 4,259,460 | 3/1981 | Schwarz . |
| 4,312,968 | 1/1982 | Jachimowicz et al. ............. 525/378 |
| 4,503,217 | 3/1985 | Alexander et al. ................ 528/392 |
| 4,824,900 | 4/1989 | Sakurai . |
| 4,914,157 | 4/1990 | Wideman . |
| 5,070,146 | 12/1991 | Coran et al. ....................... 525/192 |
| 5,102,945 | 4/1992 | Coran et al. . |
| 5,134,200 | 7/1992 | Wideman . |

FOREIGN PATENT DOCUMENTS 556727 11/1993 European Pat. Off. .

OTHER PUBLICATIONS

V. F. Kutyanina—"Main Rules of Use of Aliphatic Polyamines in Rubber Compounds"—Kauch. Rezina 1992(5), 8–10.

*Primary Examiner*—Carman J. Seccuro, Jr.
*Attorney, Agent, or Firm*—W. W. Brooks; G. B. Seward

[57] ABSTRACT

Vulcanizable rubber compositions are disclosed which contain co-activator of vulcanization which is a polymeric amine, that is, a hydrocarbon polymer with pendent alkyl amine groups. The co-activators impart increased rates of vulcanization with little decrease in scorch delay and very little increase in the modulus of the cured compositions. No increase in heat build-up or decrease in flex-fatigue life is shown. Typical polymers forming the backbone of the co-activators include EPDM rubber and polymers from butadiene or isoprene, with optional co-monomers.

15 Claims, No Drawings

RUBBER COMPOSITIONS COMPRISING A POLYMERIC AMINE CO-ACTIVATOR

This invention relates to vulcanizable rubber compositions which contain co-activators of vulcanization which are hydrocarbon polymers with pendent alkyl amine groups.

BACKGROUND OF THE INVENTION

Hydrocarbon polymers with pendent alkyl amine groups are known. U.S. Pat. Nos. 4,312,965 and 4,503,217 show these materials, and a method for making them by catalytic hydroformylation of the polymer with subsequent reaction with a primary or secondary amine. The products are said to be useful as surfactants, wet-strength agents and flocculating agents.

U.S. Pat. Nos. 5,070,146 and 5,102,945 describe co-activators of vulcanization which are interpolymers from vinylpyridine monomers.

Also, U.S. Pat. No. 5,134,200 and EP Application 556,727 show preparations of hydrocarbon polymers containing functional groups such as phenylenediamine or diphenylamine groups. These functionalized polymers are said to be useful as antidegradants for rubber.

BRIEF SUMMARY OF THE INVENTION

It has now been found that improved rubber compositions can be obtained by incorporating in a vulcanizable rubber, in addition to sulfur (or a sulfur donor) and an accelerator of vulcanization, from 0.1 to 10 parts by weight, per 100 parts by weight of the vulcanizable rubber, a co-activator which is a hydrocarbon polymer with pendent amine groups thereon of the formula

—RNR'R"

wherein R is a straight-chain, branched-chain, or cyclic hydrocarbon di or tri radical of 1–10 carbon atoms and R' and R" are the same or different straight-chain, branched-chain or cyclic alkyl hydrocarbon radicals of 1–12 carbon atoms, or R" can be a hydrogen atom. The hydrocarbon polymer backbone has a molecular weight of from about 700 to about 100,000, preferably from 1000 to 20,000 and more preferably from 2000 to 10,000.

The resultant rubber compositions of the invention possess increased rates of cure with only minor decrease in scorch delay, and very little increase in the modulus of the cured compositions. Increased cure rates are very desirable, since faster rates of production of rubber articles can thus be obtained. Molded rubber articles can be removed from the mold at an earlier time without the danger of undercure. While it is always possible to increase the cure rate of a rubber compound (up to a point) by using combinations of accelerators and/or higher levels of accelerators, these changes are often accompanied by unacceptable loss of scorch delay or an unacceptable increase in the modulus of the vulcanized article. By using the compositions of the invention, one can obtain faster curing rubber compounds with minimal decreases in scorch delay and minimal increases in the moduli of the finished articles. Further, the cured compositions exhibit no increased heat buildup or decreased flex-fatigue life.

DETAILED DESCRIPTION OF THE INVENTION

The vulcanizable rubber used in the compositions of the invention includes natural rubber, synthetic polyisoprene, polybutadiene, styrene-butadiene rubber (SBR), acrylonitrile-butadiene rubber (NBR), isoprene-isobutylene rubber (IIR) and ethylene-propylene-diene monomer rubber (EPDM). These rubbers are all capable of being cured by using accelerated sulfur vulcanization systems, to produce rubbery or elastomeric materials conforming with the definition in ASTM D1566. Preferred rubbers are SBR, polybutadiene and EPDM.

The compositions also contain sulfur and an accelerator of vulcanization. The sulfur is present as a source of crosslinks; typically, lower amounts of sulfur produce vulcanizates having lower crosslink densities, and a resultant low "state of cure." Very high amounts of sulfur, conversely, produce vulcanizates having high crosslink, and a resultant high "state of cure." Extremely high sulfur levels result in "hard rubber" or ebonite. Preferred sulfur levels in the butadiene polymers are from 0.2 to 4 parts by weight per 100 parts by weight of polymer.

Vulcanization accelerators useful in the compositions of the invention include a large number of well-known materials. Typical accelerators are listed in the "Rubber World Bluebook." The choice of which accelerator (or accelerators) to use can depend on a number of factors, and is not critical to the invention. Among usable accelerators are thiazoles, such as 2-mercaptobenzothiazole and benzothiazyl disulfide; benzothiazyl sulfenamides, such as N-cyclohexyl-2-benzothiazylsulfenamide, N,N-dicyclohexylbenzothiazylsulfenamide, N,N-diethylbenzothiazylsulfenamide, N,N-diisopropylbenzothiazylsulfenamide, N-oxydiethylenebenzothiazylsulfenamide, N-isopropylbenzothiazylsulfenamide and N-t-butylbenzothiazylsulfenamide; sulfenimides, such as N-t-butyl-benzothiazolesulfenimide; guanidines, such as di-ortho-tolylguanidine and diphenyl guanidine; thioureas, such as ethylenethiourea, tetra-methylthiourea, N,N'-diethylthiourea and N,N'-dibutyl-thiourea; thiurams, such as N,N'-dimethyl-N,N'-diphenyl-thiuram disulfide, dipentamethylenethiuram hexasulfide, tetrabutylthiuram monosulfide, tetraethylthiuram disulfide, tetrabutylthiuram disulfide and tetramethyl-thiuram disulfide; xanthates, such as zinc dibutyl xanthate and dibutyl xanthogen disulfide; and dithio-carbamates, including various salts of di-lower alkyl dithiocarbamic acid, such as the zinc, lead, ferric, copper, selenium, sodium, tellurium, potassium, bismuth, dimethylammonium and cyclohexylammonium salts.

The amount of accelerator used will vary widely, depending on the type used and the result desired, as is well known in the art. Preferred levels of accelerator are from about 0.2 to about 5 parts by weight per 100 parts by weight of vulcanizable rubber.

The co-activators of the invention are broadly defined as comprising a hydrocarbon polymer backbone of 700 to 100,000, preferably from 1000 to 20,000, and more preferably from 2000 to 10,000 molecular weight, carrying pendent amine groups of the formula

—RNR'R", in which R is a straight-chain, branched-chain or cyclic hydrocarbon di or tri radical of 1–10 carbon atoms, and R' and R" are the same or different alkyl hydrocarbon radicals of 1–12 carbon atoms, or R" in the alternative, can be a hydrogen atom. All of the R, R' and R" groups or radicals can be straight-chain, branched-chain or cyclic in nature.

The R groups can include methylene, 1,2-ethanediyl, 1,2-propanediyl, 1,3-propanediyl, 1,3-butanediyl, 2-methyl-1,2-propanediyl, and other alkanediyl groups of up to ten carbon atoms. Groups within the definition of R include those groups which result from the hydroformylation and reductive amination of EPDM rubber which contains non-conjugated diene monomer units from 1,4-hexadiene or cyclic diene monomer units from ethylidene norbornene or dicyclopentadiene. In the case where the diene monomer is ethylidenenorbornene, the R group can be

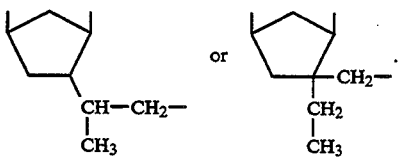

In the case where the diene monomer is dicyclopentadiene, the R group can be

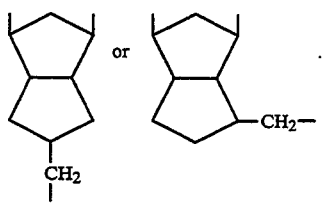

In the case where the diene monomer is 1,4-hexadiene, the R group can be

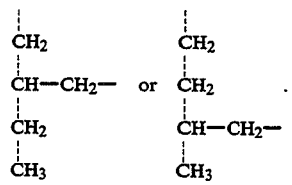

Preferred R groups are methylene, 1,2-propanediyl and 1,3-propanediyl.

R' and R" groups are preferably methyl, ethyl, n-propyl, isopropyl, n-butyl, sec-butyl or t-butyl; but can include higher alkyl groups up to 10 carbon atoms.

The co-activators of the invention usually comprise from 2 to 70 weight percent pendent amine groups on the total weight of the co-activator, and preferably 20 to 50 weight percent.

The backbone portion of the co-activator can contain residual unsaturation, but need not. In the case where EPDM is the starting polymer, essentially no unsaturation exists in the backbone; however, in the case of polybutadiene or polyisoprene backbones, a significant amount of unsaturation may remain.

The pendent —RNR'R" groups may be the same, or there may be two or more different pendent groups attached to the backbone polymer.

Although the polymeric amine co-activators of the invention can be prepared in any convenient manner, they are preferably prepared by (A) hydroformylation of a suitable unsaturated polymer and (B) reductive amination of the polyaldehyde produced in step (A).

More preferably, the polymeric amine co-activators are prepared by (A) contacting a melt or solution of an olefinically-unsaturated hydrocarbon polymer having a weight-average molecular weight (Mw) of from about 700 to about 100,000 (even more preferably from 1000 to 20,000; most preferably from 2000 to 10,000) with a mixture of carbon monoxide and hydrogen in the presence of a suitable catalyst selected from Group VIII metal catalysts such as rhodium compounds, (The most preferred catalyst is dicarbonyl acetyl-acetonate rhodium) followed by (B) reductive amination of the product of step (A) by reacting the product with one or more primary or secondary amines and hydrogen in the presence of a suitable catalyst.

If desired, a polymeric amine co-activator can be prepared by converting only a portion of the olefinic unsaturation to polyaldehyde in step (A), then, after reductive amination in step (B), repeating step (A) to react at least some of the remaining unsaturation to produce more aldehyde groups and finally repeating step (B) using a different amine. In this way, controlled amounts of different amines can be attached to the polymer.

The rubber compositions of the invention can also contain typical compounding ingredients, such as antidegradants, fillers, extender oils, zinc oxide, stearic acid and other well-known materials normally used in rubber compounds.

The co-activators of the invention have been compared with vinyl pyridine interpolymer co-activators described in U.S. Pat. No. 5,102,945. The vinylpyridine interpolymers have the disadvantage that they tend to have significant "gel content" (as described in the patent), which makes them difficult to disperse into the rubber compound. In addition, the vinyl pyridine interpolymers tend to increase the hysteresis of the rubber compound when cured, as evidenced by higher heat build-up and percent set in repeated flexing tests.

A more complete understanding of the invention can be obtained by reference to the following examples, in which all parts are by weight and all temperatures are in degrees Celsius, unless otherwise specified.

EXAMPLE 1

Polybutadiene polymer (8000 Mw molecular weight, 10–15% vinyl, 50–60% trans-1,4 and 25–35% cis-1,4 microstructure, Revertex Ltd "LX-16"), 100 g, was placed in a 300 mL Parr reactor. Hydridocarbonyltris(-triphenylphosphine)Rhodium (1) (HRh(CO)PPh$_3$)$_3$, 0.07 g, 76.2 mmol) and triphenylphosphine(PPh$_3$,3.0 g, 0.011 mol) were added to the Parr reactor and all reactants were dissolved in 100 ml toluene. The reactor was purged with nitrogen three times, and then heated to 100° C. under 5 psig nitrogen. The reactor was then charged to 600 psig with 1:1 H$_2$/CO. The progress of the reaction was measured by gas uptake from a calibrated reservoir. At the desired point, the reaction was stopped, by quickly cooling the reactor and venting the H$_2$/CO. The polymer solution was removed and concentrated by rotary evaporation, and the hydroformylated product was precipitated by slow addition of methanol (500 ml) with stirring. The solvents were decanted, and the polymer was redissolved in toluene and reprecipitated with methanol. After decanting again, residual methanol was removed by rotary evaporation, leaving a light amber toluene solution of purified polyaldehyde. By comparing the integrals for the aldehyde groups and the residual olefin groups on the polymer in the $^1$Hnmr, it was determined that 18.3% of the available double bonds had been hydroformylated.

The polymeric aldehyde solution thus prepared was placed on a rotary evaporator, where most of the toluene was removed. Ten grams of the polymeric aldehyde was dissolved in 98 ml of dimethyl formamide and 83 ml of cyclohexane and placed in a 300 ml Parr reactor. $Ru_3(CO)_{12}$ (0.02 gm $3.2 \times 10^{-5}$ moles) and di-n-butylamine (11 ml, 0.065 mole) were added and the reactor was closed and purged with $H_2/CO$ three times without stirring and three times with stirring. The reactor was then pressurized with $H_2$ to 600 psig, heated to 120° C. and the mixture was allowed to react for 18 hours. After cooling the reactor contents to ambient temperature, the product was isolated from the cyclo-hexane solvent layer and extracted with dimethyl formamide. $^1$Hnmr of the product showed complete reaction to di-n-butylamine polymer, and indicated that it contained 27.1 di(n-butyl)amine groups per chain, and had a molecular weight of 11,900.

EXAMPLE 2

The procedure of Example 1 was repeated, except that the polybutadiene polymer was hydroformylated so that 39.2% of the available double bonds were reacted to aldehyde groups. Subsequent amination with an excess of di-n-butylamine produced a polymeric tertiary amine containing 58.1 di(n-butyl) amine groups per chain, and having a molecular weight of 16,300.

EXAMPLE 3

The polymeric amine co-activators prepared in Examples 1 and 2 were incorporated into rubber compounds and tested according to standard test methods used in the rubber industry. The co-activators were incorporated at three different levels (1, 2 and 4 parts by weight per 100 parts by weight of rubber—"phr") and compared with a known vinylpyridine interpolymer co-activator at the same levels and a control compound containing no co-activator. The vinylpyridine interpolymer contained 36% vinylpyridine, 3% styrene and 61% butadiene. It had a gel content in excess of 80%.

The formulations and test data are summarized in Table I. The term "B-1 masterbatch" refers to a premixed masterbatch based on carbon black-filled SBR 1500 and containing all the normal compound ingredients except sulfur, accelerator, an antidegradant and the co-activator. Extra SBR 1502 was added as required so that the total polymeric content of each compound was a constant. (The B-1 masterbatch consists of 100 parts SBR 1502, 50 parts N-330 carbon black (HAF), 5 parts Circosol 4240 naphthenic oil, 5 parts zinc oxide and 2 parts stearic acid.) The accelerator used was t-butyl-2-benzothiazole sulfenamide (TBBS), and the antidegradant used was N-phenyl-N'-1,3-dimethylbutyl-p-phenylenediamine (6PPD).

Testing of the rubber compounds was done according to standard ASTM procedures for rubber.

Mooney scorch values were determined on a Mooney Viscometer at 121° C., and represent the compounds' resistance to premature vulcanization. The values reported are the times required for a five-point rise from the minimum Mooney viscosity at the test temperature. Larger values represent a resistance to premature vulcanization; shorter times indicate a tendency to "scorch."

Vulcanization characteristics were determined on a Monsanto Oscillating Disc Rheometer ("ODR"), the tests being performed at 153° C. Maximum and minimum torque values represent the torque (in deci Newton-Meters) at maximum vulcanization and at its lowest point—before any vulcanization—respectively. The "time to $t_2$" values are the times in minutes required for an increase of 2. dNm (2.0 in-lb.) above R min. The "time to $t_{90}$" values are the times until torque values of 90% of Rmax-Rmin are reached. The values of $t_{90}$-$t_2$ are thus inverse indications of the rates of vulcanization. The values of maximum velocity are derived by determining the maximum slope of the rheometer curve (torque vs. time) multiplied by 100, and are reported as %/minute.

The standard Goodrich Flex Test gives values of delta temperature during the test, as an indication of hysteresis, and of percent set.

The Fatigue-to-Failure test shows the numbers of cycles of flexing until sample failure.

TABLE I

| | A | B | C | D | E | F | G | H | I | J |
|---|---|---|---|---|---|---|---|---|---|---|
| B-1 Masterbatch | 166.0 | → | | | | | | | | |
| Sulfur | 2.5 | → | | | | | | | | |
| Accelerator (TBBS) | 1.2 | → | | | | | | | | |
| Antidegradant (6PPD) | 2.0 | → | | | | | | | | |
| Vinylpyridine Polymer | — | 1.0 | 2.0 | 4.0 | — | — | — | — | — | — |
| Compound Example 1 | — | — | — | — | 1.0 | 2.0 | 4.0 | — | — | — |
| Compound Example 2 | — | — | — | — | — | — | — | 1.0 | 2.0 | 4.0 |
| Mooney Scorch @ 121° C. (+5) | 58.3 | 51.2 | 46.8 | 40.7 | 44.6 | 36.0 | 34.4 | 39.6 | 35.9 | 34.2 |
| ORD Data @ 153° C. | | | | | | | | | | |
| Max. Torque, dNm | 19.5 | 18.9 | 17.9 | 16.0 | 19.1 | 19.3 | 18.9 | 19.1 | 18.8 | 17.5 |
| Min. Torque, dNm | 1.6 | 1.6 | 1.7 | 1.7 | 1.6 | 1.6 | 1.5 | 1.6 | 1.6 | 1.6 |
| Time to t90, min | 21.9 | 16.9 | 14.9 | 12.8 | 16.1 | 13.9 | 12.4 | 14.5 | 13.1 | 11.1 |
| Time to t2, min. | 8.4 | 7.6 | 6.9 | 6.1 | 6.7 | 5.8 | 5.3 | 5.9 | 5.5 | 5.3 |
| t90-t2, min. | 13.5 | 9.3 | 8.0 | 6.7 | 9.4 | 8.1 | 7.1 | 8.6 | 7.6 | 5.8 |
| Max. veloc., %/min. | 11.2 | 14.5 | 17.3 | 21.7 | 14.2 | 15.3 | 17.2 | 14.3 | 16.3 | 18.2 |
| Goodrich Flex Testing | | | | | | | | | | |
| Delta Temperature, °C. | 21.7 | 30.8 | 43.1 | 51.6 | 22 | 23.1 | 24.7 | 23.0 | 24.8 | 26.1 |
| Percent set, % | 15.8 | 22.8 | 34.1 | 36.1 | 17 | 16 | 14.1 | 16.4 | 16.8 | 17.5 |
| Fatigue to Failure | | | | | | | | | | |
| Kc to fail | 24.5 | 16.5 | 26.9 | 25.7 | 135.6 | 136.8 | 72.8 | 339.7 | 256.4 | 85.6 |

Analyzing the test data in Table I indicates that, while the prior art vinylpyridine interpolymer gives generally faster cure rates and a better (longer) scorch delay, the co-activators of the invention produce a maximum torque rate which is relatively unchanged, compared with the control. More importantly, the heat buildup during repeated flexing is substantially lower with the co-activators of the invention than with the vinylpyridine co-activators. Also, the compounds of the invention show generally improved fatigue-to-failure results.

We claim:

1. A rubber composition comprising sulfur-vulcanizable rubber, sulfur or a sulfur donor and an accelerator of vulcanization, also comprising from 0.1 to 10 parts by weight per 100 parts by weight of rubber of a co-activator, which co-activator comprises a hydrocarbon polymer backbone of 700 to 100,000 molecular weight with pendent amine groups thereon of the formula

—RNR'R", wherein R is a straight-chain, branched-chain or cyclic hydrocarbon di or tri radical of 1–10 carbon atoms and R' and R" are the same or different straight-chain, branched-chain or cyclic alkyl hydrocarbon radicals of 1–12 carbon atoms, or R" can be a hydrogen atom and wherein the hydrocarbon backbone is EPDM rubber or a polymer from butadiene or isoprene, and the pendent amine groups comprise from 2 to 70 weight percent of the co-activator.

2. The composition of claim 1 wherein the hydrocarbon backbone has a molecular weight of from 1000 to 20,000.

3. The composition of claim 2 wherein R is selected from methylene, 1,3-propanediyl and 1,2-propanediyl.

4. The composition of claim 2 wherein R' and R" are each selected from methyl, ethyl, n-propyl, isopropyl, n-butyl, sec-butyl and t-butyl.

5. The composition of claim 4 wherein R" is the same as R'.

6. The composition of claim 2 wherein R" is hydrogen.

7. The composition of claim 1 wherein the vulcanizable rubber is selected from EPDM, polyisoprene, polybutadiene and copolymers of butadiene with styrene or acrylonitrile.

8. The composition of claim 1 which contains from 1 to 4 parts of sulfur and from 0.5 parts of accelerator by weight per 100 parts by weight of the vulcanizable rubber.

9. The composition of claim 1 which contains from 0.5 to 2.0 parts of the co-activator by weight per 100 parts by weight of the vulcanizable rubber.

10. The composition of claim 10 wherein the pendent amine groups comprise from 20 to 50 weight percent of the co-activator.

11. The composition of claim 10 wherein the hydrocarbon backbone polymer is polybutadiene.

12. The composition of claim 11 wherein the molecular weight of the hydrocarbon backbone polymer is from 2000 to 10,000.

13. The composition of claim 10 wherein the hydrocarbon backbone polymer is EPDM.

14. The composition of claim 13 wherein the molecular weight of the hydrocarbon backbone polymer is from 2000 to 10,000.

15. The composition of claim 1 wherein the co-activator is the product of the hydroformylation of EPDM rubber or a polymer from butadiene followed by the reaction with an amine.

* * * * *

UNITED STATES PATENT AND TRADEMARK OFFICE
CERTIFICATE OF CORRECTION

PATENT NO. : 5,382,629

DATED : January 17, 1995

INVENTOR(S) : A.Y.Coran, S.J.Tremont, L.H.Davis, F.Ignatz-Hoover, M.P.McGrath

It is certified that error appears in the above-identified patent and that said Letters Patent is hereby corrected as shown below:

Col. 8, line 16, (Claim 10):

Reads: The composition of claim 10

Should Read: The composition of claim 9

Signed and Sealed this

Fifth Day of September, 1995

*Attest:*

BRUCE LEHMAN

*Attesting Officer*  *Commissioner of Patents and Trademarks*